US007551675B2

(12) United States Patent
Kroeger

(10) Patent No.: US 7,551,675 B2
(45) Date of Patent: Jun. 23, 2009

(54) METHOD AND APPARATUS FOR SYNCHRONIZED TRANSMISSION AND RECEPTION OF DATA IN A DIGITAL AUDIO BROADCASTING SYSTEM

(75) Inventor: Brian William Kroeger, Sykesville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 923 days.

(21) Appl. No.: 10/377,513

(22) Filed: Feb. 28, 2003

(65) Prior Publication Data

US 2004/0066736 A1 Apr. 8, 2004

Related U.S. Application Data

(60) Provisional application No. 60/414,196, filed on Sep. 27, 2002.

(51) Int. Cl.
*H04L 27/00* (2006.01)

(52) U.S. Cl. ........................ 375/259; 375/316; 375/354

(58) Field of Classification Search ................. 375/316, 375/354

See application file for complete search history.

(56) References Cited

U.S. PATENT DOCUMENTS

| | | | | | |
|---|---|---|---|---|---|
| 3,889,264 | A | | 6/1975 | Fletcher | |
| 4,054,880 | A | | 10/1977 | Dalabakis et al. | |
| 5,422,813 | A | | 6/1995 | Schuchman et al. | |
| 5,548,583 | A | * | 8/1996 | Bustamante | 370/335 |
| 5,588,022 | A | | 12/1996 | Dapper et al. | |
| 5,600,706 | A | * | 2/1997 | Dunn et al. | 455/456.2 |
| 5,636,245 | A | | 6/1997 | Ernst et al. | |
| 5,689,270 | A | * | 11/1997 | Kelley et al. | 342/357.09 |
| 5,790,784 | A | * | 8/1998 | Beale et al. | 370/520 |
| 5,913,170 | A | * | 6/1999 | Wortham | 455/457 |
| 5,936,572 | A | | 8/1999 | Loomis et al. | |
| 5,949,813 | A | | 9/1999 | Hunsinger et al. | |
| 6,011,820 | A | * | 1/2000 | Rosengren | 375/354 |

(Continued)

OTHER PUBLICATIONS

Kroeger, "Compatibility of FM hybrid in-band on-channel (IBOC) system for digital audio broadcasting", IEEE Transactions on Broadcasting, vol. 43, Issue 4, Dec. 1997 pp. 421-430.*

(Continued)

*Primary Examiner*—Juan A Torres
(74) *Attorney, Agent, or Firm*—Robert P. Lenart, Esq.; Pietragallo Gordon Alfano Bosick & Raspanti, LLP

(57) ABSTRACT

A method of transmitting digital audio broadcasting signals comprises the steps of generating a plurality of output frames of information to be transmitted, wherein each of the output frames includes a plurality of blocks of data and each of the output frames is synchronized with an absolute time reference, and transmitting the output frames to a plurality of receivers. Transmitters that broadcast in accordance with the method and receivers that receive the transmitted signal are also disclosed. A method is also provided for receiving digital audio broadcasting signals comprising the steps of receiving a digital audio broadcasting signal comprising a plurality of output frames of information, wherein each of the output frames includes a plurality of blocks of data and each of the output frames is synchronized with an absolute time reference, and determining the start of each output frame relative to an absolute time reference.

13 Claims, 5 Drawing Sheets

U.S. PATENT DOCUMENTS

| | | | | |
|---|---|---|---|---|
| 6,084,547 | A * | 7/2000 | Sanderford et al. | 342/457 |
| 6,108,315 | A | 8/2000 | Freeburg et al. | |
| 6,108,810 | A | 8/2000 | Kroeger et al. | |
| 6,178,317 | B1 | 1/2001 | Kroeger et al. | |
| 6,219,385 | B1 | 4/2001 | Weinberg | |
| 6,243,424 | B1 | 6/2001 | Kroeger et al. | |
| 6,342,854 | B1 | 1/2002 | Duffett-Smith et al. | |
| 6,345,377 | B1 | 2/2002 | Kroeger et al. | |
| 6,351,500 | B2 | 2/2002 | Kumar | |
| 6,381,464 | B1 * | 4/2002 | Vannucci | 455/456.1 |
| 6,430,227 | B1 | 8/2002 | Kroeger et al. | |
| 6,523,147 | B1 * | 2/2003 | Kroeger et al. | 714/792 |
| 6,590,944 | B1 * | 7/2003 | Kroeger | 375/340 |
| 6,765,929 | B1 * | 7/2004 | Cupo et al. | 370/478 |
| 6,982,948 | B2 * | 1/2006 | Kroeger et al. | 370/208 |
| 2001/0002822 | A1 | 6/2001 | Watters et al. | |
| 2002/0095228 | A1 * | 7/2002 | Corts et al. | 700/94 |

OTHER PUBLICATIONS

Kroeger “Robust modem and coding techniques for FM hybrid ICOC DAB”, IEEE Transactions on Broadcasting, vol. 43, Issue 4, Dec. 1997 pp. 412-420.*

Kroeger, “Robust modem and coding techniques for FM hybrid ICOC DAB”, IEEE Transactions on Broadcasting, Publication Date: Dec. 1997, vol. 43, Issue: 4, pp. 412-420.*

U.S. Appl. No. 09/382,716, filed Aug. 24, 1999, Kroeger et al.

IBOC FM Transmission Specification, Aug. 2001, pp. 1-38.

IBOC AM Transmission Specification, Nov. 2001, pp. 1-28.

* cited by examiner

METHOD AND APPARATUS FOR SYNCHRONIZED TRANSMISSION AND RECEPTION OF DATA IN A DIGITAL AUDIO BROADCASTING SYSTEM

CROSS-REFERENCE TO RELATED APPLICATION

This application claims the benefit of U.S. Provisional Patent Application Ser. No. 60/414,196, filed Sep. 27, 2002.

FIELD OF THE INVENTION

This invention relates to In-Band-On-Channel (IBOC) Digital Audio Broadcasting (DAB), and more particularly to the synchronization of IBOC DAB signals.

BACKGROUND OF THE INVENTION

IBOC DAB systems are designed to permit a smooth evolution from current analog Amplitude Modulation (AM) and Frequency Modulation (FM) radio to a fully digital In-Band On-Channel system. These systems can deliver digital audio and data services to mobile, portable, and fixed receivers from terrestrial transmitters in the existing Medium Frequency (MF) and Very High Frequency (VHF) radio bands. Broadcasters may continue to transmit analog AM and FM simultaneously with the new, higher-quality and more robust digital signals, allowing conversion from analog to digital radio while maintaining current frequency allocations.

Digital Audio Broadcasting (DAB) can provide digital-quality audio, superior to existing analog broadcasting formats. Both AM and FM In-Band On-Channel DAB signals can be transmitted in a hybrid format where the digitally modulated signal coexists with the currently broadcast analog signal, or in an all-digital format where the analog signal has been eliminated. IBOC DAB requires no new spectral allocations because each IBOC DAB signal is transmitted within the spectral mask of an existing AM or FM channel allocation. IBOC DAB promotes economy of spectrum while enabling broadcasters to supply digital quality audio to the present base of listeners.

One AM IBOC DAB system, set forth in U.S. Pat. No. 5,588,022, presents a method for simultaneously broadcasting analog and digital signals in a standard AM broadcasting channel. Using this approach, an amplitude-modulated radio frequency signal having a first frequency spectrum is broadcast. The amplitude-modulated radio frequency signal includes a first carrier modulated by an analog program signal. Simultaneously, a plurality of digitally modulated carrier signals are broadcast within a bandwidth that encompasses the first frequency spectrum. Each digitally modulated carrier signal is modulated by a portion of a digital program signal. A first group of the digitally modulated carrier signals lies within the first frequency spectrum and is modulated in quadrature with the first carrier signal. Second and third groups of the digitally-modulated carrier signals lie in upper and lower sidebands outside of the first frequency spectrum and are modulated both in-phase and in-quadrature with the first carrier signal. Multiple carriers employ orthogonal frequency division multiplexing (OFDM) to bear the communicated information. U.S. Pat. No. 6,243,424 also discloses an AM IBOC DAB system.

FM IBOC DAB systems have been the subject of several United States patents including U.S. Pat. Nos. 6,430,227; 6,345,377; 6,243,424; 6,108,810; and 5,949,796. In an FM compatible digital audio broadcasting system, digitally encoded audio information is transmitted simultaneously with the existing analog FM signal channel. The advantages of digital transmission for audio include better signal quality with less noise and wider dynamic range than with existing FM radio channels. Initially the hybrid format would be used allowing existing receivers to continue to receive the analog FM signal while allowing new IBOC DAB receivers to decode the digital signal. Sometime in the future, when IBOC DAB receivers are abundant, broadcasters may elect to transmit the all-digital format. Hybrid IBOC DAB can provide virtual CD-quality stereo digital audio (plus data) while simultaneously transmitting the existing FM signal. All-digital IBOC DAB can provide virtual CD-quality stereo audio along with a data channel.

In one type of hybrid FM DAB system an analog modulated carrier is combined with a plurality of orthogonal frequency division multiplexed (OFDM) sub-carriers placed in the region from about 129 kHz to 199 kHz away from the FM center frequency, both above and below the spectrum occupied by an analog modulated host FM carrier. Some IBOC options permit subcarriers starting as close as 100 kHz away from the center frequency. The bandwidth of the existing analog FM signal is significantly smaller than the bandwidth occupied by the OFDM subcarriers.

In an all-digital version, the analog modulated host signal is removed, while retaining the above sub-carriers and adding additional sub-carriers in the regions from about 100 kHz to 129 kHz above and below the FM center frequency. These additional sub-carriers can transmit a backup signal that can be used to produce an output at the receivers in the event of a loss of the main, or core, signal.

OFDM signals include a plurality of orthogonally spaced carriers all modulated at a common symbol rate. The frequency spacing for rectangular pulse symbols (e.g., BPSK, QPSK, 8PSK or QAM) is equal to the symbol rate. For IBOC transmission of FM/DAB signals, redundant sets of OFDM sub-carriers are placed in an upper sideband (USB) and a lower sideband (LSB) on either side of a coexisting analog FM carrier. The DAB sub-carrier power is set to about −25 dB relative to the FM signal. The level and spectral occupancy of the DAB signal is set to limit interference to its FM host while providing adequate signal-to-noise ratio (SNR) for the DAB sub-carriers. Certain ones of the subcarriers can be reserved as reference subcarriers to transmit control signals to the receivers.

One feature of digital transmission systems is the inherent ability to simultaneously transmit both digitized audio and data. Digital audio information is often compressed for transmission over a bandlimited channel. For example, it is possible to compress the digital source information from a stereo compact disk (CD) at approximately 1.5 Mbps down to 96 kbps while maintaining the virtual-CD sound quality for FM IBOC DAB. Further compression down to 48 kbps and below can still offer good audio quality, which is useful for the AM DAB system or a low-latency backup and tuning channel for the FM DAB system. Various data services can be implemented using the composite DAB signal. For example, a plurality of data channels can be broadcast within the composite DAB signal.

U.S. patent application Ser. No. 09/382,716, filed Aug. 24, 1999, and titled "Method And Apparatus For Transmission And Reception Of Compressed Audio Frames With Prioritized Messages For Digital Audio Broadcasting", U.S. Pat. No. 6,721,337, discloses a method and apparatus for assembly modem frames for transmission in IBOC DAB systems, and is hereby incorporated by reference.

There is a need for transmitting and receiving IBOC DAB signals in a manner that enables improvements in receiver performance and/or the efficient implementation of various services conducted with the use of IBOC DAB signals.

SUMMARY OF THE INVENTION

This invention provides a method of transmitting digital audio broadcasting signals comprising the steps of generating a plurality of output frames of information to be transmitted, wherein each of the output frames includes a plurality of blocks of data and each of the output frames is synchronized with an absolute time reference, and transmitting the output frames to a plurality of receivers. The transmitted information can identify the location of a transmitter.

The absolute time reference can comprise a global positioning system signal. The blocks of data can include a block count. The plurality of output frames can represent a plurality of logical data channels.

The plurality of logical data channels can include information relating to particular geographic regions, such as advertisements for local retailers, gas stations, and restaurants; traffic conditions; and highway construction/detour information.

The invention also encompasses transmitters for transmitting digital audio broadcasting signals comprising means for generating a plurality of output frames of information to be transmitted, wherein each of the output frames includes a plurality of blocks of data and each of the output frames is synchronized with an absolute time reference, and means for transmitting the output frames to a plurality of receivers.

The invention further encompasses receivers for receiving digital audio broadcasting signals comprising an antenna for receiving a digital audio broadcasting signal comprising a plurality of output frames of information, wherein each of the output frames includes a plurality of blocks of data and each of the output frames is synchronized with an absolute time reference, and means for determining the start of each output frame relative to the absolute time reference.

The receiver can further comprise means for decoding transmitter location information contained in the output frames, means for scanning multiple digital audio broadcasting signals, and means for estimating the time difference of arrival between at least three digital audio broadcasting signals.

The receiver can further comprise means for estimating receiver location based on the transmitter location information and the time difference of arrival between the digital audio broadcasting signals.

The receiver can further comprise means for estimating direction and speed of the receiver based on the transmitter location information and the time difference of arrival between the digital audio broadcasting signals.

The invention further encompasses a method for receiving digital audio broadcasting signals comprising the steps of receiving a digital audio broadcasting signal comprising a plurality of output frames of information, wherein each of the output frames includes a plurality of blocks of data and each of the output frames is synchronized with an absolute time reference, and determining the start of each output frame relative to the absolute time reference. The method can further comprise the step of decoding transmitter location information contained in the modem frames.

The method can also comprise the steps of scanning multiple digital audio broadcasting signals, and estimating the time difference of arrival between at least three of the digital audio broadcasting signals. The method can further comprise the step of estimating receiver location based on transmitter location information and time difference of arrival between the digital audio broadcasting signals. The method can also comprise the step of estimating direction and speed of the receiver based on the transmitter location information and the time difference of arrival between the digital audio broadcasting signals.

DETAILED DESCRIPTION OF THE INVENTION

IBOC DAB FM and AM systems can provide digital audio and data services to the multiple receivers. Precise synchronization of IBOC broadcast transmitters can enable a number of features in the receivers. These features include faster tuning or frequency reacquisition of the DAB signal, faster symbol and frame acquisition, faster channel scanning time, and automatic receiver clock calibration. Additional features of particular interest to mobile receivers include, receiver location estimation, as well as the transmission of maps and navigation aids, traffic conditions, and messages dependent on location. The messages can be used to provide location-dependent advertisements, and/or information about local gas stations, restaurants, highway construction, etc.

Figure 1:
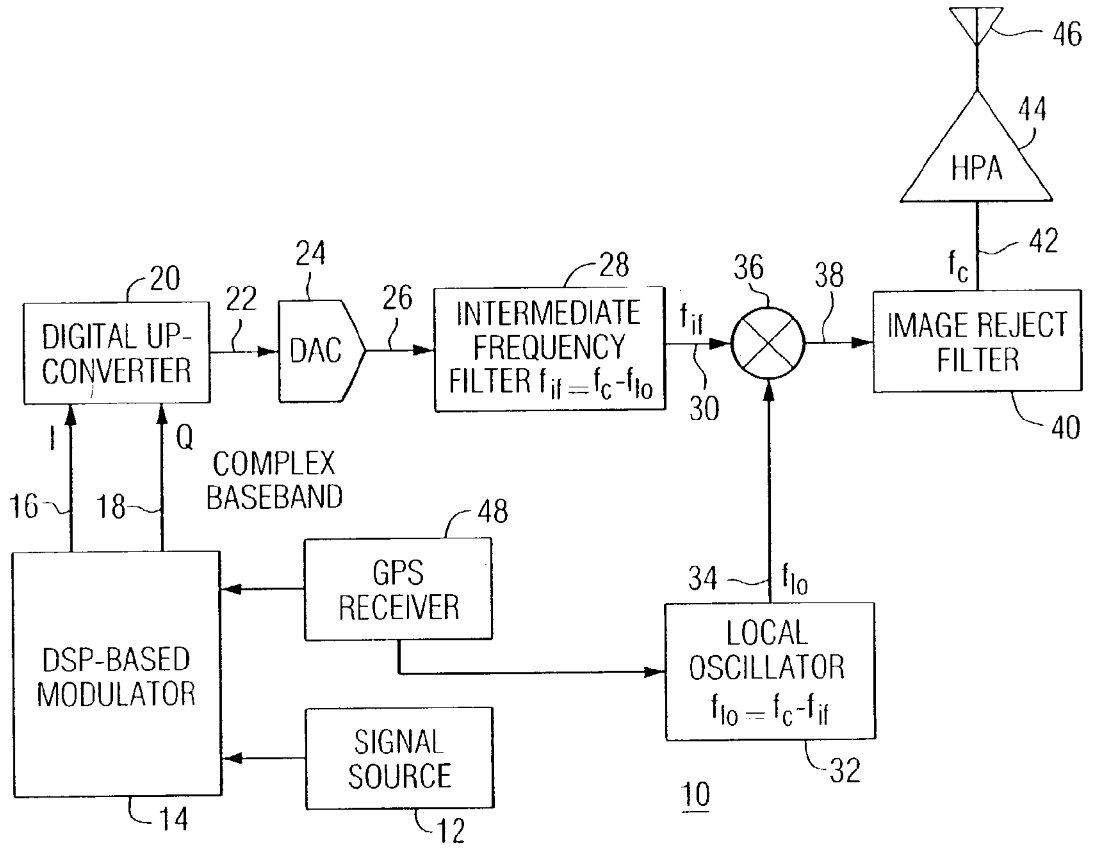
FIG. 1 is a functional block diagram of a transmitter for use in a digital audio broadcasting system that can transit signals formatted in accordance with this invention.

Referring to the drawings, FIG. 1, is a block diagram of a DAB transmitter 10 which can broadcast digital audio broadcasting signals in accordance with the present invention. A signal source 12 provides one or more signals to be transmitted. The source signal may take many forms, for example, an analog program signal that may represent voice and/or music, a digital information signal that may represent the same voice and/or music, and alternatively or additionally include data such as traffic information. A digital signal processor (DSP) based modulator 14 processes the source signals in accordance with various known signal processing techniques, such as source coding, interleaving and forward error correction, to produce in-phase and quadrature components of a complex base band signal on lines 16 and 18. The signal components are shifted up in frequency, filtered and interpolated to a higher sampling rate in up-converter block 20. This produces digital samples at a rate $f_s$, on intermediate frequency signal $f_{if}$ on line 22. Digital-to-analog converter 24 converts the signal to an analog signal on line 26. An intermediate frequency filter 28 rejects alias frequencies to produce the intermediate frequency signal $f_{if}$ on line 30. A local oscillator 32 produces a signal $f_{lo}$ on line 34, which is mixed with the intermediate frequency signal on line 30 by mixer 36 to produce sum and difference signals on line 38. The sum signal and other unwanted intermodulation components and noise are rejected by image reject filter 40 to produce the modulated carrier signal $f_c$ on line 42. A high power amplifier 44 then sends this signal to an antenna 46. Each transmitter can be equipped with a means for providing an absolute time reference signal, such as a global positioning system (GPS) receiver 48 which can receive a GPS signal to provide a time base and a reference clock from which the clocking for the modulated data symbols is derived.

The basic unit of transmission of the DAB signal is the modem frame, which can be on the order of a second in duration. This duration is required to enable sufficiently long interleaving times to mitigate the effects of fading and short outages or noise bursts such as may be expected in a digital audio broadcasting system. The delay for the main digital interleaved audio channel can be no less than the duration of the modem frame. However, this delay is not a significant disadvantage since one IBOC DAB system in which the invention may be used already employs a diversity delay technique, which intentionally delays the digital signal for several seconds with respect to the analog signal. A DAB system which includes time diversity is described in commonly owned U.S. Pat. No. 6,178,317. An analog or digital time diversity signal is provided for fast tuning acquisition of the signal. Therefore the main digital audio signal is processed in units of modem frames, and any audio processing, error mitigation, and encoding strategies should be able to exploit this relatively large modem frame time without additional penalty.

A format converter can be used to repackage the compressed audio frames in a manner that is more efficient and robust for transmission and reception of the IBOC signal over the radio channel. A standard commercially available audio encoder can initially produce the compressed audio frames. An input format converter can remove unnecessary information from the audio frames generated by the audio encoder. This unnecessary information can include frame synchronization information as well as any other information, which can be removed or modified for DAB audio transmission without impairing the audio information. An IBOC DAB modem frame assembler can reinsert synchronization information in accordance with this invention in a manner that is more efficient and robust for DAB delivery. A format converter at the receiver can be used to repackage the recovered audio frames to be decoded by a standard audio decoder.

Both the AM and FM IBOC DAB systems arrange the digital audio and data in units of modem frames. The systems are both simplified and enhanced by assigning a fixed number of audio frames to each modem frame. A scheduler determines the total number of bits allocated to the audio frames within each modem frame. The audio encoder then encodes the audio frames using the bit allocation for that modem frame. The remaining bits in the modem frame are consumed by the multiplexed data and overhead.

The modem frame can contain information relating to several services. The services can be considered to be broadcast in individual logical channels. DAB service modes define the number of logical channels to be broadcast in a particular DAB signal.

Figure 2:
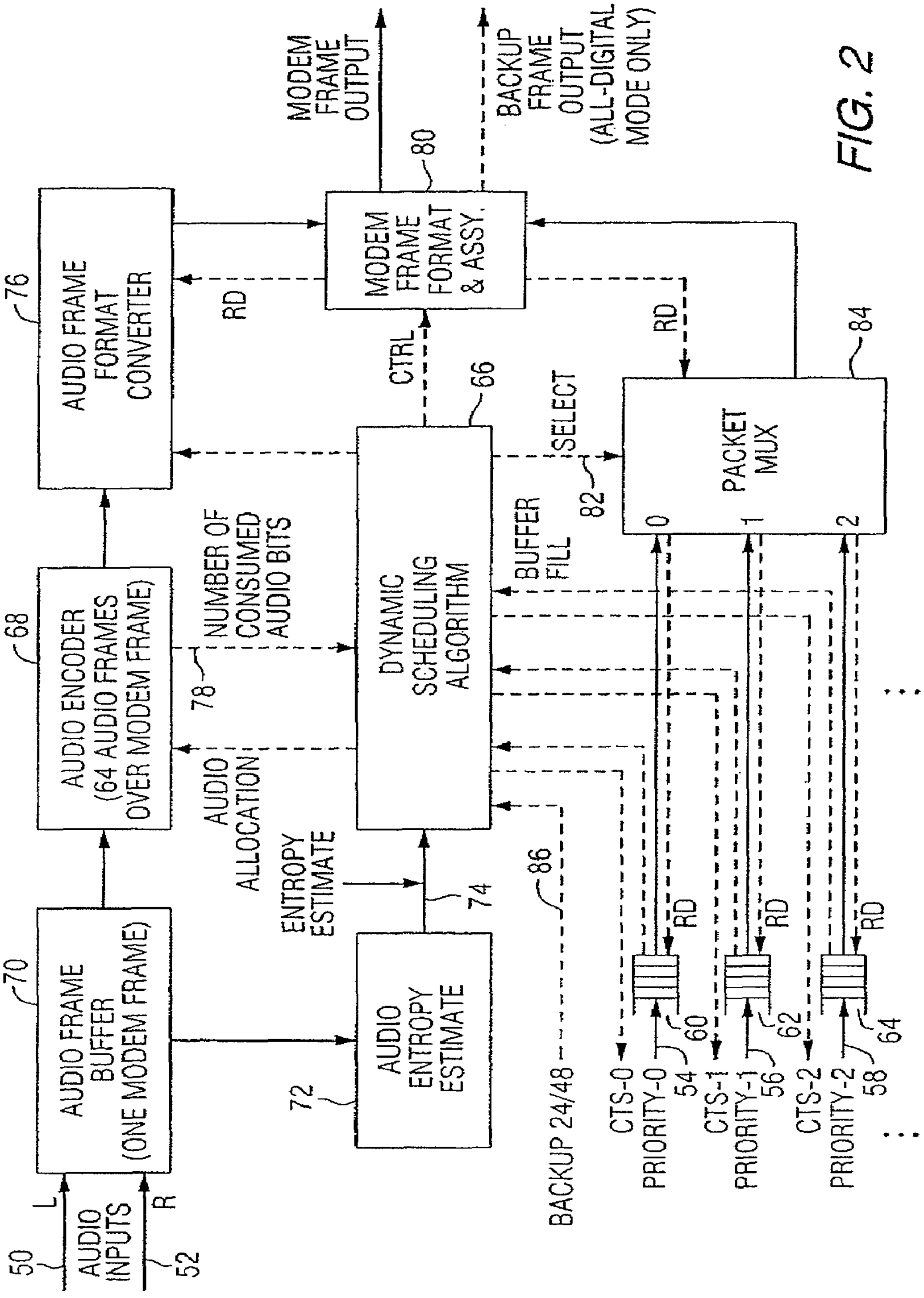
FIG. 2 is a functional block diagram illustrating the method of multiplexing and encoding audio and prioritized data packets in accordance with this invention.

A functional block diagram of a process for assembling an output modem frame is presented in FIG. 2. The functions illustrated in FIG. 2 can be performed in block 14 of FIG. 1. In this example, left and right audio DAB programming signals are supplied on lines 50 and 52. Data messages (also referred to as auxiliary data) having various levels of priority are supplied on lines 54, 56 and 58, and stored in buffers 60, 62 and 64. A dynamic scheduling algorithm 66, or scheduler, coordinates the assembly of the modem frame with an audio encoder 68. The amount of auxiliary data that may be transmitted is determined by multiple factors. The audio encoder can initially scan the audio content of the audio information in an audio frame buffer 70 holding the audio information to be transmitted in the next modem frame. The scanning is done to estimate the complexity or "entropy" of the audio information for that modem frame, as illustrated by block 72. This entropy estimate can be used to project the target number of bits required to deliver the desired audio quality. Using this entropy estimate on line 74, along with the quantity and priority assignments of the data in the messages in buffers 60, 62 and 64, the dynamic scheduling algorithm allocates the bits in the modem frame between data and audio.

After a number of bits have been allocated for the next modem frame, the audio encoder encodes all the audio frames (e.g. 64 audio frames) for the next modem frame and passes its result to the audio frame format converter 76. The actual number of bits consumed by the audio frame is presented to the scheduler on line 78 so it can make best use of the unused bit allocation, if any. The audio frame format converter removes any header information and unnecessary overhead and passes the resulting "stripped" audio frames to the modem frame format and assembly function block 80.

The dynamic scheduling algorithm, or scheduler, can generally operate as follows. First, if no data messages are pending, then the scheduler allocates all the capacity of the next modem frame to the compressed audio. This would often result in more bits than the target number of bits required to achieve the desired audio quality. Second, if only low priority messages are pending, then the capacity of the modem frame in excess of the target number of bits for audio is allocated to the messages (data). This should result in no loss of audio quality relative to that desired. Third, if high priority messages are pending, then the scheduler must make a compromise between the audio quality and the timely delivery of the high priority messages. This compromise can be evaluated using cost functions assigned to message latency goals versus the potential reduction in audio quality. The messages to be transmitted can be selected by sending a signal as illustrated by line 82 to a data packet multiplexer 84.

The modem frame format and assembly function arranges the audio frame information and data packets into a modem frame. Header information including the size and location of the audio frames, which had been removed in the audio frame format converter, are reinserted into the modem frame in a redundant, but efficient, manner. This reformatting improves the robustness of the IBOC DAB signal over the less-than-reliable radio channel. For transmission in the all-digital IBOC DAB mode, backup frames, based on data supplied on line 86, are also generated. The backup frames can provide a time diverse redundant signal to reduce the probability of an outage when the main signal fails. In normal operation, the backup frames are code-combined with the main channel to yield an even more robust transfer of information in the presence of fading. The analog signal (AM or FM) is used in place of the backup frames in the Hybrid IBOC system.

The modem frames (approximately 1.5 seconds each) can be comprised of 256 OFDM symbols (FM IBOC) or 128 OFDM symbols (AM IBOC). Each modem frame carries information from which absolute time relative to the start of the modem frame can be derived. The tolerance on this time determines the potential accuracy of the system. A tolerance of 1 microsecond, for example, results in a radio propagation distance accuracy of about 1000 feet. The coordinates of the transmitter antenna can also be conveyed by the digital signal.

The transmitted IBOC DAB signal may be regarded as a series of unique modem frames of duration $T_f$. In order to reference all transmissions to absolute time, each modem frame is associated with an Absolute Time Frame Number (ATFN). In one example, this universal frame numbering scheme can assume that the start of ATFN 0 occurred at 00:00:00 Universal Time Coordinated (UTC) on Jan. 6, 1980. The start of every subsequent output frame would then occur at an exact integer multiple of $T_f$ after that instant in time. The ATFN can be a binary number determined by subtracting the Global Positioning System (GPS) start time (00:00:00 on Jan. 6, 1980) from the current GPS time (making allowance for the GPS epoch), expressing the difference in seconds, and multiplying the result by the frame rate, $R_f$. A new GPS epoch starts every 1024 weeks. The second epoch began at midnight between Aug. 21, 1999 and Aug. 22, 1999.

The ATFN can be used to schedule the delivery of time-critical programming. It does not have to be broadcast as part of the transmitted IBOC signal.

Each modem frame may be considered to include sixteen output blocks of duration $T_b$. The output Block Count (BC) indicates the position of the current output block within the output modem frame. An output block count of 0 signifies the start of an output modem frame, while a BC of 15 designates the final output block in an output modem frame. The BC is broadcast on the reference subcarriers and is used by the receiver to aid in synchronization. Each output block can include a plurality of audio frames.

Figure 3:
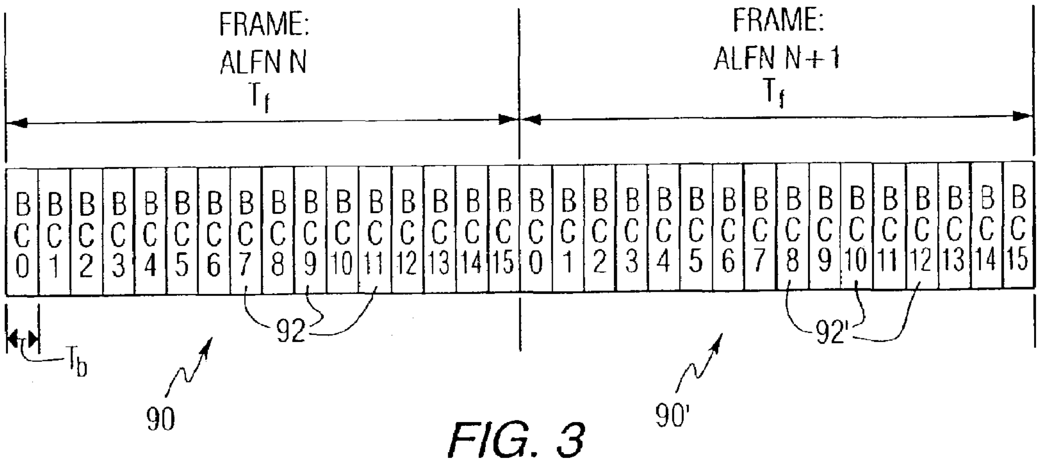
FIG. 3 is a schematic representation of the modem frame format used with the present invention.

An illustration of the relationship of output blocks to modem frames is shown in FIG. 3. Each modem frame 90 and 90' includes a plurality of blocks 92 and 92'. In order to ensure precise time synchronization, each instance of the transmitted signal s(t) is assigned an ATFN and BC, which relates it to an absolute time reference.

All modem frames transmitted over the air from stations locked to GPS time are aligned precisely with this absolute time definition. Therefore, all GPS-locked IBOC radio stations, at any given instant, will be transmitting at exactly the same point within the current modem frame.

Figure 4:
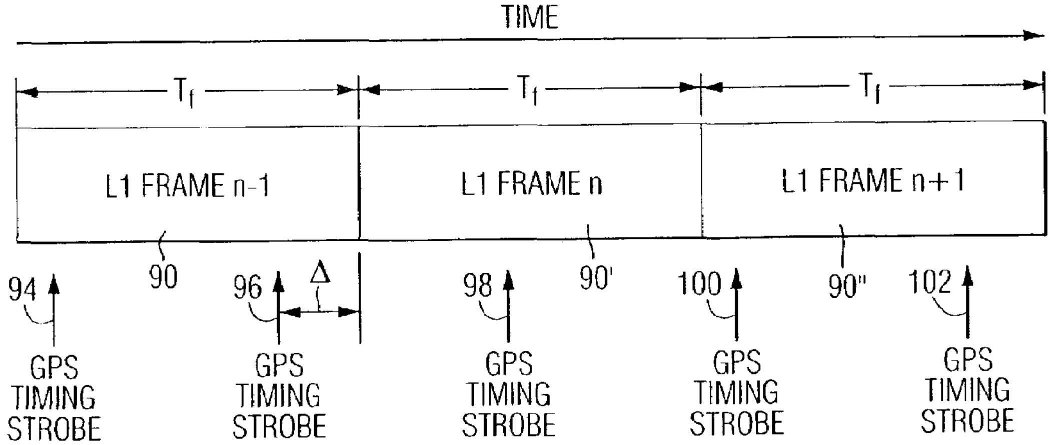
FIG. 4 is a schematic representation of the timing of various logical channels that can be used with the present invention.

This can be accomplished through synchronization with a signal synchronized in time and frequency to the Global Positioning System (GPS). FIG. 4 shows an example of output frames 90, 90' and 90" and GPS timing strobes 94, 96, 98, 100, and 102. The GPS signal includes timing strobes that are very precise and typically occur at 1 second intervals. When a station prepares to commence an IBOC transmission, the system will receive GPS time, calculate a future ATFN, and measure its time position relative to the start of the immediately preceding GPS-locked timing strobe. The transmitter will then delay transmission of output frame n by the measured amount Δ.

In cases where transmissions are not locked to GPS, time synchronization utilizes the same ATFN and BC numbering scheme, but the accuracy requirements are relaxed, and transmissions cannot be synchronized with other stations.

There are several issues of time alignment that the transmission system must address. For facilities so equipped, every transmitted modem frame must be properly aligned with GPS time. Also, the various logical channels must be properly aligned with each other. In some service modes, some channels are purposely delayed by a fixed amount to accommodate diversity combining at the receiver.

In addition to maintaining the proper relationship between the transmission of output modem frames and GPS time, the transmitter can also maintain the timing relationships between logical channels and impose diversity delay on selected channels. To accomplish this, variations in internal processing time must be absorbed to maintain message alignment with the block clock and ATFN timing. Some logical channels can be specified to minimize latency, which constrains the timing of data transfer within the transmitter.

An IBOC DAB system can support two levels of synchronization for each broadcaster. Synchronization Level I is a network synchronized mode (for example, using Global Positioning System (GPS) locked transmission facilities), and synchronization Level II is a non-networked synchronized mode (for example, using non-GPS-locked transmission facilities). Operation at a Level I synchronization can support numerous advanced system features.

Analog and digital versions of program material can be separated in time by a diversity delay. The fixed value of diversity delay can be in the range of 2 to 6 seconds. If the system employs a programmable diversity delay value, the value can be selectable by each individual broadcaster and the delay parameter selection can be broadcast to the receiver. The absolute accuracy of the diversity delay in an FM system can preferably be within ±50 μs. The absolute accuracy of the diversity delay in an AM system can preferably be within ±100 μs.

For synchronization Level II facilities, the absolute accuracy of the carrier frequency (including the analog carrier for hybrid transmissions) and modulation symbol clock frequency can preferably be maintained to within 1 part per $10^6$ at all times.

For synchronization Level I facilities, the absolute accuracy of the carrier frequency (including the analog carrier for hybrid transmissions) and modulation symbol clock frequency can preferably be maintained to within 1 part per $10^8$ at all times.

For synchronization Level I broadcast facilities, all transmissions would have their symbol and frame timing phase locked to absolute GPS time within ±1 μsec. The system can provide a means for the broadcaster to indicate to the receiver whether it is a Level I or Level II facility, and can broadcast any change in status to receiver devices.

Synchronization Level I stations would be capable of providing ensemble transmission features and broadcasting information for receiver position determination. Level II stations would not have this capability.

The total symbol clock frequency and carrier frequency absolute error due to all sources within the system including the transmission and receiving equipment should be no greater than 101 ppm.

Various frame formats can be constructed to provide an efficient and robust IBOC DAB communications system. Moreover, the frame formatting can enable important features including time diversity, rapid channel tuning, multi-layer FEC code combining between main and backup channels, redundant header information (a form of unequal error protection), and flexibility in allocating throughput between audio frames and data messages. Many of the features of the frame formats are particularly applicable to the all-digital FM IBOC DAB system. The FM hybrid frame formats are made to be compatible with the FM all-digital formats.

Figure 5:
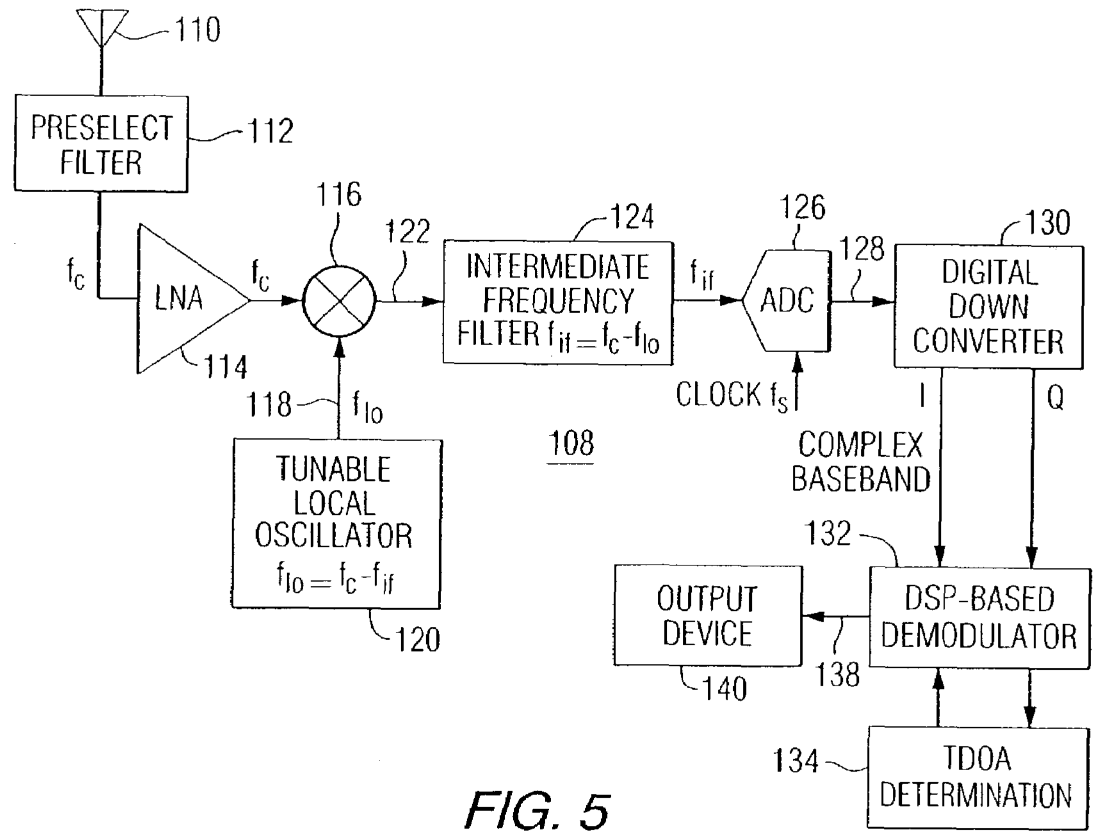
FIG. 5 is a functional block diagram of a receiver that can process signals in accordance with this invention.

The receiver performs the inverse of some of the functions described for the transmitter. FIG. 5 is a block diagram of a radio receiver 108 capable of performing the signal processing in accordance with this invention. The DAB signal is received on antenna 110. A bandpass preselect filter 112 passes the frequency band of interest, including the desired signal at frequency $f_c$, but rejects the image signal at $f_c-2f_{if}$ (for a low side lobe injection local oscillator). Low noise amplifier 114 amplifies the signal. The amplified signal is mixed in mixer 116 with a local oscillator signal $f_{lo}$ supplied on line 118 by a tunable local oscillator 120. This creates sum ($f_c+f_{lo}$) and difference ($f_c-f_{lo}$) signals on line 122. Intermediate frequency filter 124 passes the intermediate frequency signal $f_{if}$ and attenuates frequencies outside of the bandwidth of the modulated signal of interest. An analog-to-digital converter 126 operates using a clock signal $f_s$ to produce digital samples on line 128 at a rate $f_s$. Digital down converter 130 frequency shifts, filters and decimates the signal to produce lower sample rate in-phase and quadrature signals. A digital signal processor based demodulator 132 then processes the in-phase and quadrature signals to produce an output signal on line 138 for output device 140. The time difference of arrival (TDOA) of signals received by the receiver can be determined as illustrated by block 134, and discussed in detail below.

Figure 6:
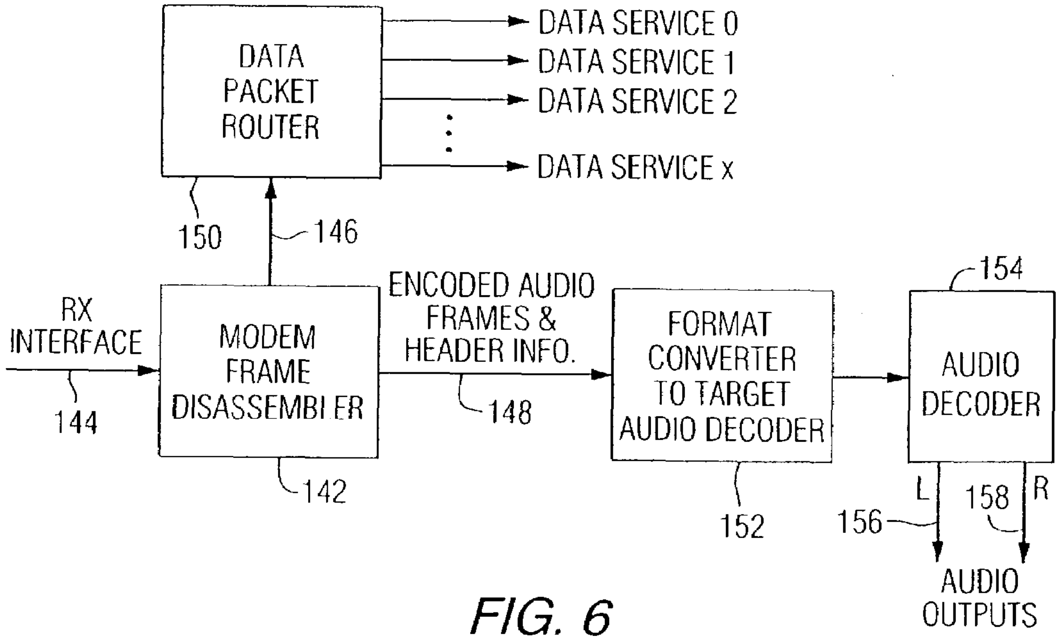
FIG. 6 is a block diagram illustrating a portion of the signal processing performed in the receiver of FIG. 5.

FIG. 6 is a block diagram illustrating the modem frame demodulating of audio and data performed in the receiver of FIG. 5. A frame disassembler 142 receives the signal to be processed on 144 and performs all the necessary operations of deinterleaving, code combining, FEC decoding, and error flagging of the audio and data information in each modem frame. The data, if any, is processed in a separate path on line 146 from the audio on line 148. The data is then routed as shown in block 150 to the appropriate data service. The data priority queuing is a function of the transmitter, not the receiver. The audio information from each modem frame is processed by a format converter 152 which arranges the audio information into an audio frame format that is compatible with the target audio decoder 154 that produces the left and right audio outputs 156 and 158.

Initial receiver acquisition must allow extra time to acquire an unknown frequency, symbol and frame time. However, the synchronization level of the broadcasters affects retuning time. When retuning from one Level I (GPS-locked) station to another, the time to reacquire the new station will be faster. If either the station tuned to or tuned from are Level II stations, the time will be longer due to the extra time required to lock onto the new symbol and frame timing.

For example, retuning can require roughly ½ second to re-establish frequency, symbol and Block synchronization, and to estimate channel state information (CSI) for subsequent forward error correction (FEC) decoding. Stations that are synchronized could eliminate approximately ¼ second of this time since the Block (AM) or Block-pair (FM) boundaries are known. Some additional but small time is saved in frequency and symbol reacquisition times using GPS-locked stations. Overall the time lost in retuning for Block (AM) or Block-pair (FM) data, or an audio Backup channel can be cut in half, or better. The time savings is less significant for Modem Frame interleaved bits. This benefit results in faster receiver scanning and search for specific types of broadcasts, and faster audio acquisition for AM, or FM All-Digital broadcasts.

Figure 7:
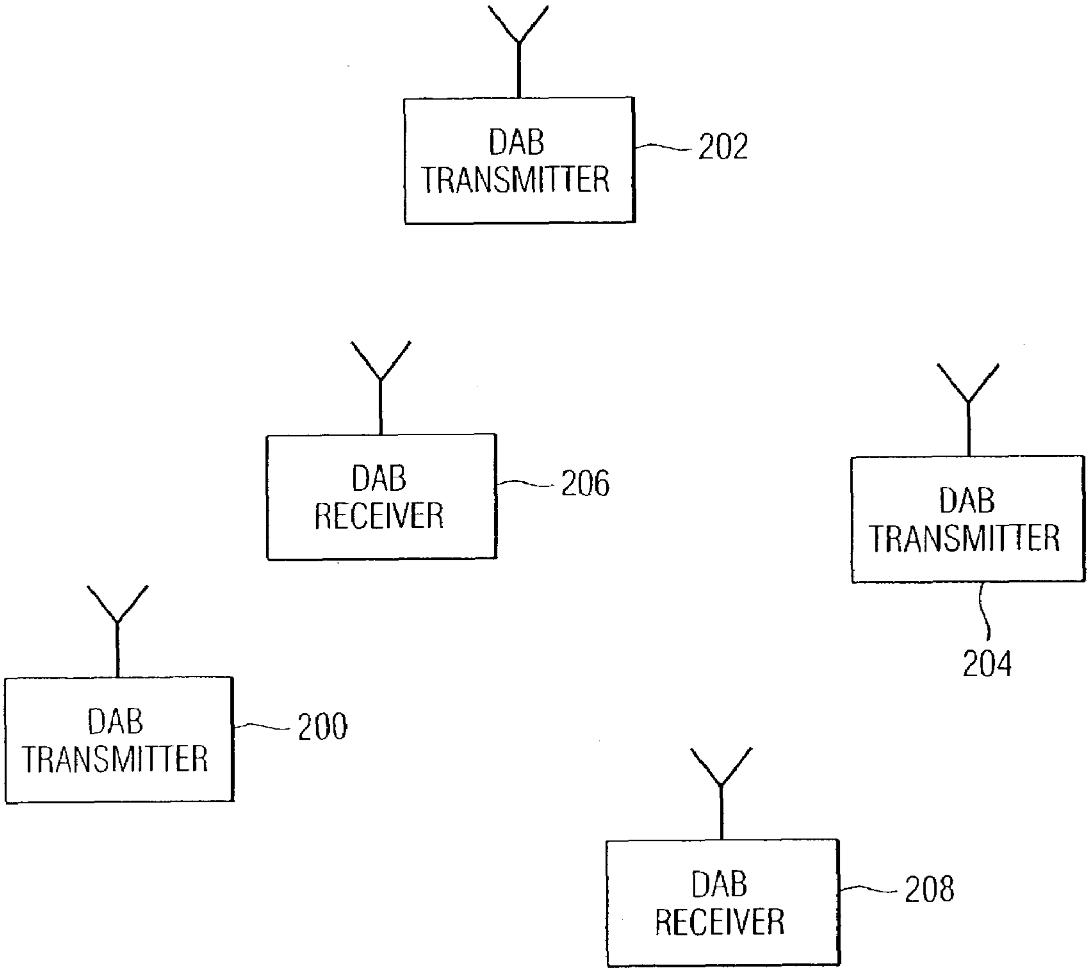
FIG. 7 is a schematic representation of a network of DAB transmitters.

FIG. 7 is a schematic representation of a network of transmitters that can provide various data services to receivers within range of the transmitters. The transmitters 200, 202 and 204 can each transmit different program and data information. However, the receivers 206, 208 can take advantage of the fact that the output modem frames of each of the transmitters are referenced to an absolute time.

Each receiver can receive a transmitted IBOC DAB signal, identify the start of the modem frames, and decode the time and transmitter location information within the digital data. A practical tolerance for estimating the start of the modem frames is roughly one to several microseconds for an FM IBOC DAB signal. For AM IBOC DAB modem frames the tolerance can be about 10 microseconds. Other fixed receiver delays in filtering and signal processing should be considered and, possibly, subtracted when determining the time.

Precise synchronization of IBOC broadcast transmitters can enable a number of important features for receivers which enhance normal operation. These features can include: faster tuning or frequency reacquisition; faster symbol and frame acquisition; faster channel scanning time; and automatic receiver clock calibration.

The synchronization can also enable features such as receiver location and direction estimation. To determine the location of a receiver, the receiver can scan multiple frequencies, then estimate the time difference of arrival between the DAB signals from at least three Level I synchronized transmitters. Although a receiver may only receive a single frequency at any given time, it can advance local time through its clock relative to any derived signal timing. Comparing the relative times between multiple received signals can provide a measure of the time difference of arrival TDOA between the signals within a tolerance where several microseconds. When scanning several stations in series, the symbol timing is established as a reference by the first station. When the second station is acquired, the new symbol timing is compared to a virtual "flywheel" symbol timing of the first station to estimate a TDOA offset. Then the third station is compared establishing another TDOA. These TDOAs, along with the information collected about each transmitter location, can be used in the estimation of the receiver location.

The TDOA between any pair of signals can provide sufficient information to estimate a geographic curve (portion of an ellipse) on the earth's surface. A third station can be used to generate two more curves where the intersection of the three curves defines a location.

In addition, the three signals can also be used to estimate absolute time at the receiver since the location and propagation distances (times) are then known. Furthermore, the direction and speed of a vehicle can also be derived from the dynamic TDOA information. Knowledge of the TDOAs and location of each transmitter can be used to fine-tune the absolute time at the receiver location since the calculated propagation delays can now be subtracted from the modem frame timing. The direction and speed can be estimated after several location measurements over a period of time. This is possible because the location measurements and times at those locations can be used to determine a vector of vehicle movement.

Maps and navigation aids can be prestored or actively received and updated. Regional information can, for example, be broadcast and received over the IBOC system. The information can, for example, include advertisements for local retailers, gas stations, and restaurants; traffic conditions; and highway construction/detour information. This information can be filtered at the receiver. For example, once a receiver determines its location using the process described above, it can select one or more particular logical channels of the IBOC DAB signal to produce an output for the user. The selected logical channel can contain information related to the region surrounding the location of the receiver. Alternatively or in addition, the receiver can access stored information relating to the region surrounding the location of the receiver.

While the present invention has been described in terms of its preferred embodiment, it will be understood by those skilled in the art that various modifications can be made to the disclosed embodiment without departing from the scope of the invention as set forth in the claims.

What is claimed is:

1. A receiver for receiving digital audio broadcasting signals comprising:

an antenna for receiving at least three in-band on-channel digital audio broadcasting signals transmitted by at least three transmitters, each of the digital audio broadcasting signals comprising a plurality of modem frames of different information, wherein each of the modem frames includes information from which absolute time relative to a start of the modem frame can be derived and includes data identifying a location of one of the transmitters; and a processor for determining a time difference of arrival between the modem frames in the received digital audio broadcasting signals and for using the time difference of arrival and the location data to estimate a location of the receiver, wherein the receiver scans the digital audio broadcasting signals and the processor advances local time through a clock to derive relative signal timing for determining the time difference of arrival.

2. The receiver of claim 1, wherein the processor estimates absolute time at the receiver using the location of the receiver and propagation times of the received digital audio broadcasting signals.

3. The receiver of claim 1, wherein the modem frames include a block count, wherein the processor establishes symbol timing in a first one of the digital audio broadcasting signals as a reference and compares symbol timing in a second one of the digital audio broadcasting signals to a virtual symbol timing of the first digital audio broadcasting signal to estimate a time difference of arrival offset.

4. The receiver of claim 1, wherein the processor uses the time difference of arrival and the location data to estimate direction and speed of the receiver.

5. The receiver of claim 4 wherein the direction and speed are estimated at several locations over a period of time.

6. A method for receiving digital audio broadcasting signals comprising the steps of:

using an antenna to receive at least three in-band on-channel digital audio broadcasting signals transmitted by at least three transmitters, each of the digital audio broadcasting signals comprising a plurality of modem frames of different information, wherein each of the modem frames includes information from which absolute time relative to a start of the modem frame can be derived and includes data identifying a location of one of the transmitters; and using processing circuitry to determine a time difference of arrival between the modem frames in the received digital audio broadcasting signals and using the time difference of arrival and the location data to estimate a location of the receiver, wherein the digital audio broadcasting signals are scanned and the processing circuitry advances local time through a clock to derive relative signal timing for determining the time difference of arrival.

7. The method of claim 6, wherein the processing circuitry estimates absolute time at the receiver.

8. The method of claim 6, wherein the processing circuitry establishes symbol timing in a first one of the digital audio broadcasting signals as a reference and compares symbol timing in a second one of the digital audio broadcasting signals to a virtual symbol timing of the first digital audio broadcasting signal to estimate a time difference of arrival offset.

9. The method of claim 6, wherein the processing circuitry uses the time difference of arrival and the location data to estimate direction and speed of the receiver.

10. The method of claim 9, wherein the direction and speed are estimated at several locations over a period of time.

11. The method of claim 6, wherein the processing circuitry selects one or more logical channels in the one of the digital audio broadcasting signals to produce an output.

12. The method of claim 11, wherein the selected logical channels contain information relating to a region surrounding the location of the receiver.

13. The method of claim 6, wherein the processing circuitry accesses stored information relating to a region surrounding the location of the receiver.

* * * * *

UNITED STATES PATENT AND TRADEMARK OFFICE

CERTIFICATE OF CORRECTION

PATENT NO. : 7,551,675 B2
APPLICATION NO. : 10/377513
DATED : June 23, 2009
INVENTOR(S) : Brian William Kroeger It is certified that error appears in the above-identified patent and that said Letters Patent is hereby corrected as shown below:

Title Page (2); Other Publications
Delete Duplicate
“Kroeger, “Robust modem and coding techniques for FM hybrid ICOC DAB”, IEEE Transactions on Broadcasting, Publication Date: Dec. 1997, vol. 43, Issue: 4, pp. 412-420.*”

Signed and Sealed this

Eighth Day of December, 2009

David J. Kappos
*Director of the United States Patent and Trademark Office*